United States Patent [19]

Achiha

[11] 4,296,436
[45] Oct. 20, 1981

[54] NOISE REDUCING SYSTEM
[75] Inventor: Masahiko Achiha, Iruma, Japan
[73] Assignees: Hitachi, Ltd.; Hitachi Denshi Kabushiki Kaisha, both of Tokyo, Japan
[21] Appl. No.: 68,527
[22] Filed: Aug. 21, 1979
[30] Foreign Application Priority Data Aug. 21, 1978 [JP] Japan ............................. 53-100951

[51] Int. Cl.³ .............................................. H04N 5/21
[52] U.S. Cl. .................................. 358/167; 358/105
[58] Field of Search ............... 358/167, 166, 180, 183, 358/105

[56] References Cited
U.S. PATENT DOCUMENTS 4,163,249 7/1979 Michael et al. ....................... 358/22

*Primary Examiner*—Richard Murray
*Attorney, Agent, or Firm*—Craig and Antonelli

[57] ABSTRACT

A noise reducer wherein, depending upon the magnitude of a difference signal between an input television signal at the present time and a television signal recorded in a frame memory and with noise reduced, the mixing ratio between the present-time input signal and the television signal obtained from the frame memory is varied, and a part of the mixed signal is applied to the frame memory while the other part is used as a television signal with noise reduced; a noise reducing system wherein, in order to make the reduction of noise possible even for a moving object, a movement of a picture in one frame time is detected, the output of the frame memory is compensated for with the movement, and depending upon the magnitude of a difference signal between the present-time input television signal and the movement compensated output signal of the frame memory, the mixing ratio between the present-time input television signal and the compensated output signal of the frame memory is varied.

5 Claims, 5 Drawing Figures

NOISE REDUCING SYSTEM

BACKGROUND OF THE INVENTION

1. Field of the Invention

This invention relates to a noise reducing system, and more particularly to improvements in a system which reduces noise in television signals by the use of a frame memory.

2. Description of the Prior Art

In order to reduce noise included in television signals, there has been proposed a system using a frame memory, wherein a difference signal between an input television signal and a television signal representing the preceding frame of the television picture as stored in the frame memory is generated; depending upon the magnitude of the difference signal, the mixing ratio between the input television signal and the signal obtained from the frame memory is varied; and a part of the mixed signal is derived as a signal with the noise reduced, while the other part is stored into the frame memory; whereby the noise included in the input signal is reduced. (SMPTE Journal, Vol. 87, No. 3, March '78, "A Digital Noise Reducer for Encoded NTSC Signal" by R. H. McMann, S. Kreinik, J. K. Moore, A. Kaiser and J. Rossi)

As will be explained in more detail later, the prior-art noise reducing system proposed has a high effect of reducing noise for pictures of small variations. However, in a picture area where the frame difference signal is very large, the noise reducing effect is low and the signal-to-noise ratio or S/N ratio is inferior, the quality of the reproduced picture becomes unnatural, and a very high effect of reducing noise cannot be demonstrated.

LIST OF PRIOR ART (37 CFR 1. 56(a))

The following reference is cited to show the state of the art:

U.S. Pat. No. 4,064,530 "Noise Reduction System For Color Television"

SUMMARY OF THE INVENTION

It is accordingly an object of this invention to provide, in the system for reducing noise in television signals by the use of a frame memory, a noise reducing system which, even in the case of a picture of a moving object, exhibits a noise reducing effect as in the case of a picture having a small or no variation.

In order to accomplish this object, the present invention provides for detection of the variation of a picture of an object from an input television signal and a signal representing the picture one frame earlier as stored in a frame memory and with noise reduced. The displacement or movement of the object per frame is then calculated, a signal with the movement compensated for (a signal corresponding to the same object part as the input television signal) is obtained, and the difference signal between the compensated signal and the input television signal is then used to control the coefficient of a controller for noise reduction, i.e., a circuit for controlling the mixing ratio between the input television signal and the television signal from the frame memory precedent by one frame.

That is, according to this invention, in the case where a picture has moved (where a variation exists) the quantity of movement is detected, a picture signal preceding by one frame is shifted by an amount equal to the quantity of movement thereof, and the coefficient for noise reduction is controlled in dependence on the magnitude of the difference signal between the shifted signal and the input signal. Therefore, the coefficient can be set as in the case of a still picture, and the noise reducing effect can be enhanced even in the presence of a large variation in the picture.

The above-mentioned and other objects and features of this invention will become more apparent from the following description of a prior-art system as well as embodiments of this invention.

DESCRIPTION OF THE PREFERRED EMBODIMENTS

Figure 1:
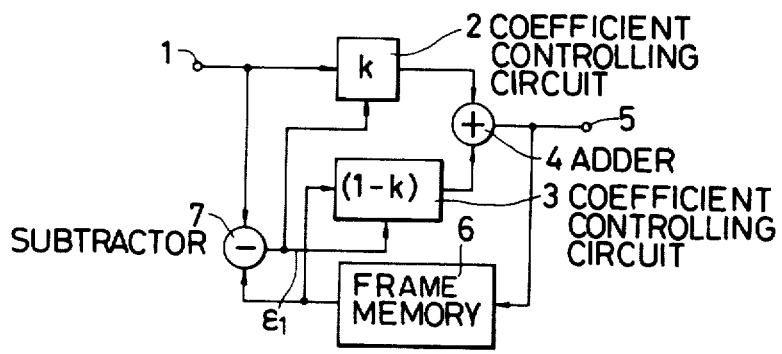
FIG. 1 is a schematic block diagram showing the construction of a prior-art noise reducer.

In order to facilitate an understanding of this invention, the principle of a noise reducing system for television signals proposed previously will be described with reference to FIG. 1.

A television signal received at an input terminal 1 has its difference $\epsilon_1$ taken by a subtractor 7 with respect to the corresponding signal of the preceding frame (a signal one frame earlier than the input television signal and situated at the same position as that of the latter) as stored in a frame memory 6. The difference signal $\epsilon_1$ is multiplied by k by means of a coefficient controlling circuit 2 whose coefficient value k ($0 \leq k \leq 1$) varies depending upon the magnitude of the difference signal $\epsilon_1$. The output signal of the frame memory is also multiplied by $(1-k)$ by means of a coefficient controlling circuit 3. Both the resultant signals are added by an adder 4. The sum signal from adder 4 with noise reduced is delivered to an output terminal 5, and is simultaneously stored into the frame memory 6.

In this system, in the case where the difference signal $\epsilon_1$ between the two adjacent frame signals is small, the coefficient k is made close to 0 (zero), and an accumulated value of the plurality of frames is delivered, so that the noise can be much reduced. That is, when a picture moves little, the difference signal $\epsilon_1$ between the adjacent frames becomes small, and the coefficient k of the coefficient controlling circuit 2 becomes small. Therefore, the signal provided by a loop consisting of the frame memory 6, the coefficient controlling circuit 3 (whose coefficient $(1-k)$ approximates 1) and the adder 4 is taken out to the output terminal 5 as a main constituent. While repeatedly passing through the loop, the picture signals which are correlative among the frames are averaged. Since the noise is not correlative among the frames, the noise components lessen when averaged.

On the other hand, in the case where the frame difference signal $\epsilon_1$ has become large due to the movement of an object (picture), a serious degradation in the picture quality will result if the coefficient k is held small, because the input television signal and the signal from the frame memory are not correlative and a different picture is mixed. Therefore, as $\epsilon_1$ becomes larger, k is increased to come nearer to 1. Thus, the output signal is mainly composed of the component which has passed through the input terminal 1, the coefficient controlling circuit 2 and the adder 4, and the degradation of the picture quality attributed to the movement of the object is avoided. Since, however, the signal component of the loop consisting of the parts 6 - 3 - 4 lessens, the noise reducing effect is lost.

Figure 2:
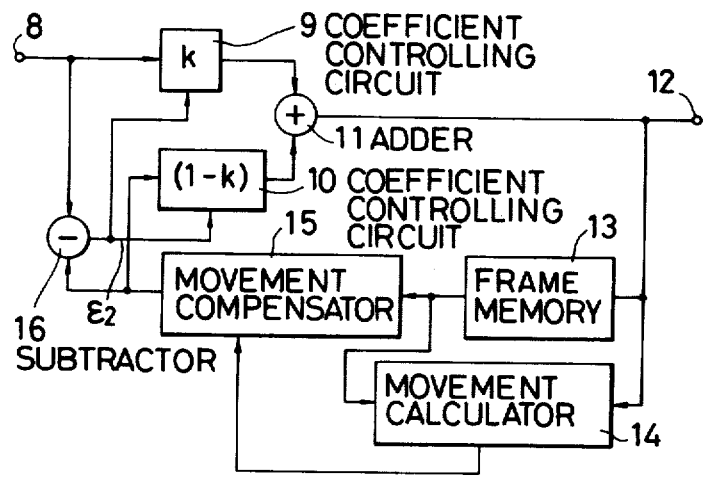
FIG. 2 is a schematic block diagram showing the principle construction of a noise reducer according to this invention.

FIG. 2 shows the principle construction of a circuit for realizing a noise reducing system according to this invention. Referring to the figure, numeral 8 designates an input terminal, numerals 9 and 10 coefficient controlling circuits, numeral 11 an adder, numeral 12 an output terminal, and numeral 16 a subtractor. Since these parts have the same constructions and operations as the parts 1, 2 and 3, 4, 5, and 7 in FIG. 1, respectively, the detailed explanation thereof is omitted. A characterizing feature of this invention consists in that the movement on a plane of an object in 1-frame period is calculated from input and output signals of a frame memory 13 by a movement calculator 14, the movement of the object is compensated for by a movement compensator 15, in other words, the picture preceding 1-frame is moved to the position of the picture of the input television signal, to obtain the signal 1-frame earlier corresponding to the same object part as that of the input television signal, the difference $\epsilon_2$ between this signal 1-frame earlier and the input signal is obtained by the subtractor 16, and the coefficient k is controlled by the use of the difference signal $\epsilon_2$.

Figure 3:
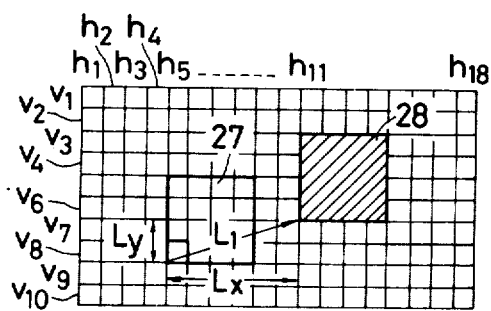
FIG. 3 is a diagram showing a part of a picture for explaining the principle of this invention.

FIG. 3 conceptionally illustrates a screen of moving parts for explaining the movement of pictures, and shows the pictures of two successive frames in a manner to overlap each other.

In the figure, two squares 27 and 28 represent the part of the picture before the movement or the picture corresponding to the preceding frame and the part of the picture after the movement or the picture of the present-time frame, respectively. For simplicity sake, it is assumed that the other parts of the picture shall be identical to both the pictures of the present-time frame and the preceding frame. The figure illustrates that the square part has moved up rightwards by an amount $L_1$ in one frame period. Accordingly, the movement calculator 14 in FIG. 2 investigates the correlation between the scanning signals of the present-time frame and the preceding frame and detects the quantity $L_1$ indicative of the movement, and more particularly, the horizontal component $L_x$ and vertical component $L_y$ thereof. The movement compensator 15 takes out that picture element among the corresponding picture elements of the preceding frame which shifts $-L_x$ and $-L_y$ horizontally and vertically respectively from the position of the picture element to be compared presently. Thus, even when the pictures have moved, the comparison is made as if they were two frames of still pictures. Of course, in the case where the variation of the pictures is not the result of movement, but is the result of a change of content, there is no correlation, and the system operates so as to increase the coefficient k.

Figure 4:
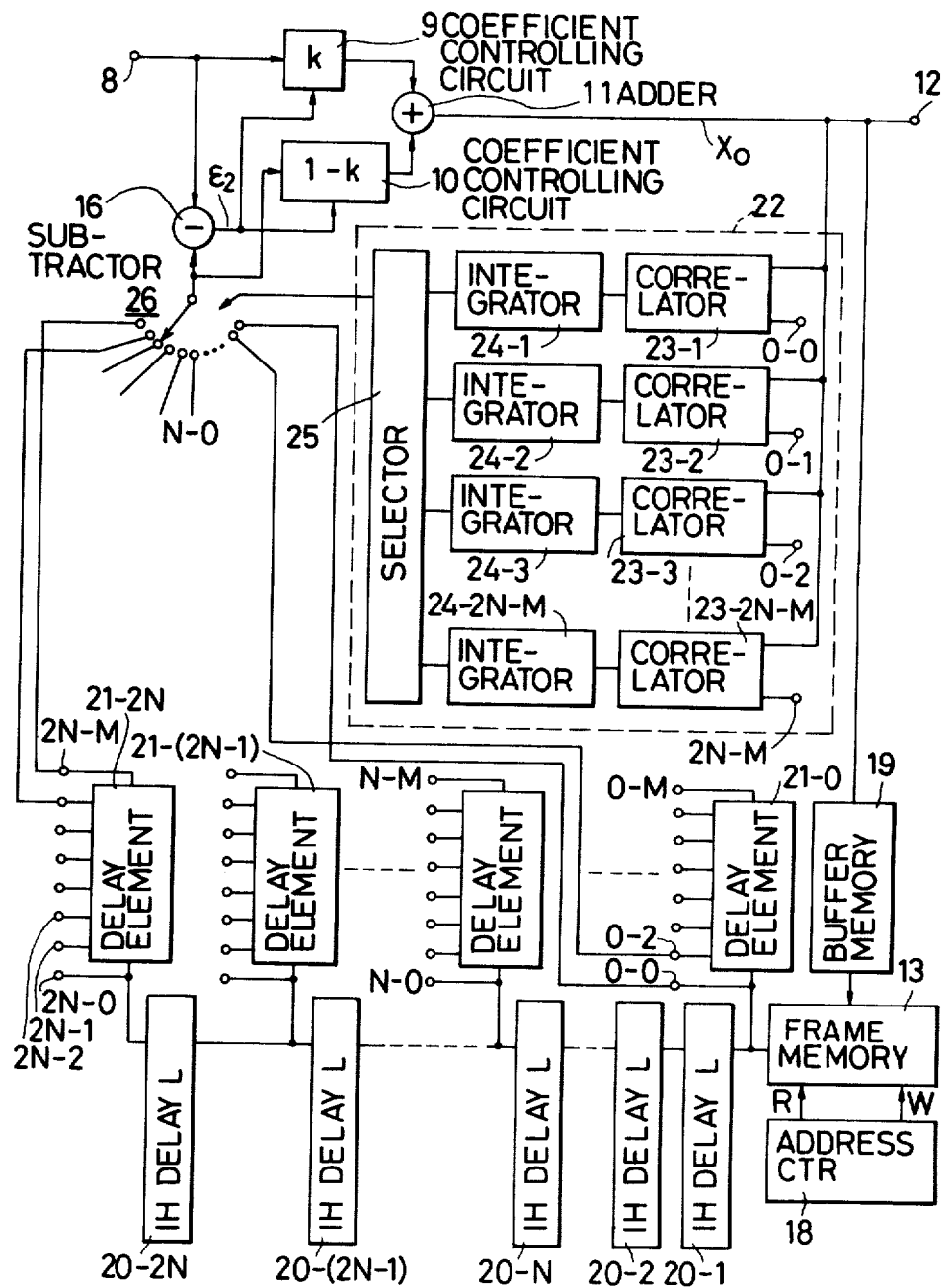
FIGS. 4 and 5 are schematic circuit diagrams each showing an embodiment of the noise reducer according to this invention.

FIG. 4 is a circuit diagram showing the construction of an embodiment of the noise reducing system according to this invention. In the figure, the constructions and operations of the input terminal 8, the coefficient controlling circuits 9 and 10, the adder 11, the subtractor 16 and the output terminal 12 are the same as in FIGS. 1 and 2.

A part of a signal $x_0$ provided as the output of the adder 11 and with noise reduced is passed via a buffer memory 19 having a capacity of $N \cdot T_H$ (where N denotes the maximum number of lines of movement in the vertical direction by which a picture can move in one frame time, and $T_H$ denotes the scanning period of one line), and the signal is stored in a predetermined position of a frame memory 13 assigned by an address signal W being an output of an address counter 18, which is controlled by the television sync signals. The signal written in the frame memory 13 is read out by an address signal R after a fixed time (1 frame time $-2 N \cdot T_H$). The output signal of the frame memory 13 is applied to a plurality of cascaded delay lines 20-1, 20-2, ... 20-N, ..., 20-(2N-1) and 20-2N each having a delay time equal to $T_H$.

Delay elements 21-0, ..., 21-N, ..., 21-(2N-1) and 21-2N are connected to input and output parts of the respective delay lines. The delay elements serve to obtain a plurality of signals into which the outputs (or inputs) of the delay lines have been delayed with the picture element scanning time as a unit. The maximum value of the number of picture elements is determined in correspondence with the maximum movement $M \cdot t$ (where M denotes the maximum number of picture elements in the horizontal direction, and t denotes the scanning time of one picture element) up to which the picture is supposed to move in the horizontal direction in one frame time.

Output terminals of the respective delay elements are denoted by 0-0, ... 0-M, ..., N-0, ... N-M, ..., 2N-0, ... and 2N-M as indicated in the figure. Signals of picture elements preceding times (1 frame time $-N \cdot T_i + P \cdot T_H + Q \cdot t$) are provided from the respective terminals. Here, P and Q are arbitrary integers subject to $|P| \leq N$ and $|Q| \leq M/2$.

The plurality of outputs of the delay elements are applied to the corresponding number of input terminals of a change-over switch circuit 26 and to a correlator circuit 22.

The correlator circuit 22 is composed of that number of correlators 23 (which is equal to the number of all the output terminals of the delay elements 21), integrators 24 connected in series with the correlators 23, and a selector 25 for detecting the position of the integrator which provides the maximum output among the plurality of integrators 24. The output of the selector 25 functions as a driving signal for the switch circuit 26, and connects an output line of the switch circuit with the terminal of the delay element corresponding to the position of the integrator which provides the maximum output. In order to simplify the circuit arrangement, the correlator circuit 22 is sometimes constructed of subtractors, threshold circuits and accumulators which are connected in cascade, instead of the correlators and integrators.

Since the construction and operation of each block in the above arrangement are well known to those skilled in the art, the detailed description thereof is omitted.

Also in the above arrangement, in the case where the picture has been still, the integrator 24-N-0 corresponding to the output terminal N-0 of the delay element at which the summation of the delay times of the delay lines and the delay elements becomes $N \cdot T_H$ provides the maximum output, and the control signal to connect with the corresponding input line N-0 of the switch circuit 26 is sent from the selector 25 to the switch circuit 26.

In the case of FIG. 3, the picture has moved 6 elements in the horizontal direction and 2 lines in the vertical direction. Therefore, the terminal which provides the maximum output is the fifth terminal from below (N-2)-5 (not shown) of the delay element which is connected to the second delay line (not shown) before the delay line 20-N. Accordingly, in the case where the position of the picture element of the input television signal of the subtractor 16 is ($h_{11}$, $V_6$) in FIG. 3, the position of the picture element in the preceding frame and with the movement compensated for is ($h_5$, $V_8$) in FIG. 3, and the subtraction is made between these picture elements. Therefore, the pictures coincide, and the subtraction is identical to that of the case of still pictures in the prior-art system (FIG. 1), so that the coefficient k can be made small and the noise reducing effect can be enhanced in spite of the change (movement) of the pictures.

In the above embodiment, description has been made of the case where, by specifying the maximum range of the movements of pictures, the number of circuit elements of the delay lines and elements 20 and 21, the correlators 23, the integrators 24 etc. which constitute the movement detector is made small. The system, however, can also be constructed by employing a 1-frame memory as the buffer memory 19 without limiting the range of movements.

Figure 5:
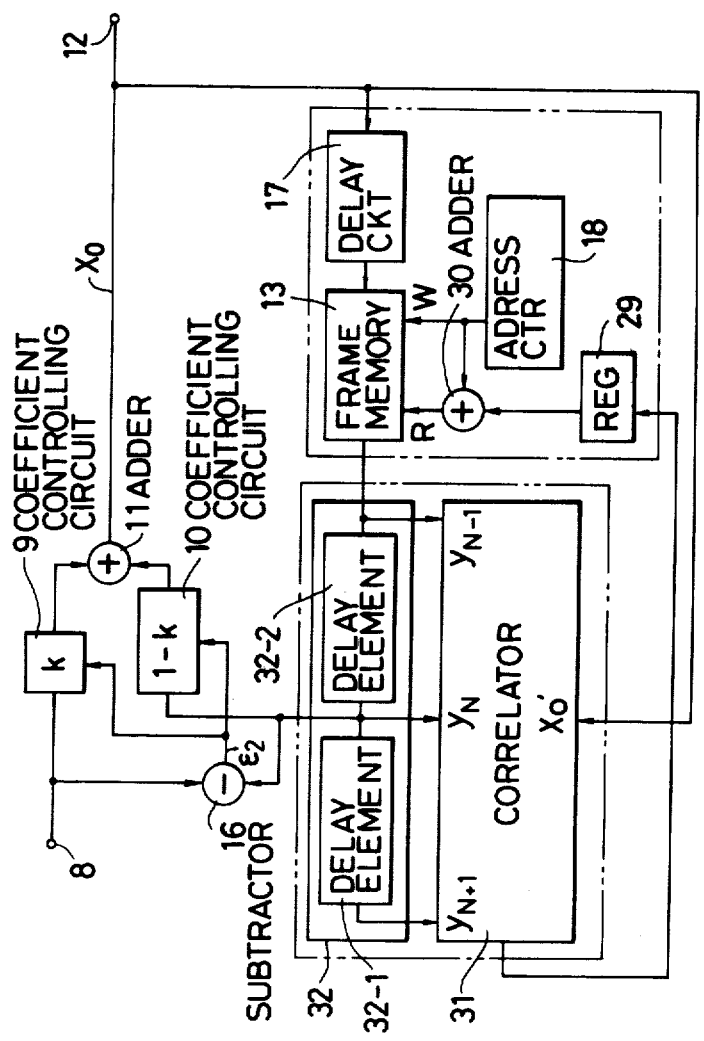

FIG. 5 is a circuit diagram showing another embodiment of the noise reducing circuit according to this invention. In the case of the embodiment shown in FIG. 4, when it is to be applied to pictures of quick variations, the number of delay lines and elements and correlators sometimes becomes large. The present embodiment simplifies the circuit arrangement, and has a movement compensating function by properly following up even pictures of violent variations.

In FIG. 5, the constructions of an input terminal 8, coefficient controlling circuits 9 and 10, adder 11, subtractor 16 and output terminal 12 are identical to those of the parts assigned the same numerals in FIGS. 2 and 4.

A signal $x_o$ from the adder 11 with noise reduced is partly derived from the output terminal 12 into a predetermined circuit, and is partly recorded in succession via a delay circuit 17 into a predetermined memory location of a frame memory 13 assigned by a writing address signal W being an output signal of an address counter 18. The content of the frame memory 13 is read out from a location which is assigned by a reading address signal R independent of the writing address signal W. For a reason to be stated later, the signal read out is a signal with a movement compensated for, that is, a signal corresponding to an identical object precent 1-frame time to an input television signal. The reading address signal R for reading out the signal with the movement due to a variation compensated for is obtained in such a way that the writing address signal W and an output of a register 29 for recording the movement per frame are added by an adder 30.

The signal precedent by one frame which has been read out from the frame memory 13 and which has had the movement compensated for is applied to a delay circuit 32 which consists of two delay elements 32-1 and 32-2 each having a delay time equal to the scanning time of one picture element. Then, a signal $y_N$ preceding one frame and with the movement compensated for as corresponds to the input signal $x_o$ and also signals $y_{N\pm1}$ before and after the signal $y_N$ are provided. The output signals $y_{N-1}$, $y_N$ and $y_{N+1}$ are applied to a correlator circuit 31. The correlator circuit is constructed of three correlators which investigate the correlations between the respective signals and the output signal $x_o$ of the adder 11, and a circuit which discriminates the correlator providing the maximum output among outputs of the three correlators. It selects the signal ($y_N$, $y_{N-1}$ or $y_{N+1}$) indicating the maximum correlation with the signal $x_o$, and generates a movement-compensating error signal (0, +1 or −1) corresponding to the selected signal. The movement-compensating error signal is applied to the register 29 for storing the movement, to correct the content of the register and to prepare for the processing of the next picture element. In other words, the movement-compensating error signal is made as small as possible by the feedback loop. As stated above, in the present embodiment, the velocity of movement of the picture is stored in the register 29, only the error between the stored content and the movement of the input signal $x_o$ is calculated by the error detector 31, and the quantity of the error is negatively fed-back. Therefore, even when the variation of the picture is violent, it can be followed up without increasing the number of circuit elements.

The delay circuit 17 serves to prevent the signal of the preceding frame from disappearing when the picture has moved downwardly of the screen. It effects substantially the same function as that of the buffer memory 19 in the embodiment of FIG. 4. Its memory capacity suffices if a signal corresponding to the maximum vertical movement per frame can be stored, and it is constructed of a shift register, a buffer memory or the like. Although the number of the delay elements of the delay circuit has been described as being two, it may well be further increased to increase the kinds of outputs of the error detector. In addition, although in the above embodiment only the compensator circuit in the case of the horizontal movement has been explained for brevity of description, a compensator circuit can be constructed quite similarly in the case of a vertical movement.

As set forth above, this invention is characterized in that the picture movement is compensated for in the hitherto-known noise reducing system for television signals which employs a frame memory, whereby even in case of the variation of a picture, such as caused by movement thereof, the noise reducing effect can be demonstrated without incurring any degradation in the picture quality. This invention is not restricted to the foregoing embodiments.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A noise reducing system comprising first circuit means for detecting a variation of a picture from an input picture signal and a past picture signal by mixing said signals with a selectively variable ratio; second circuit means for controlling the mixing ratio between the input picture signal and the past picture signal in response to an output signal of said first circuit means; and memory circuit means for delaying the output of said second circuit means a fixed time period to provide said past picture signal; said second means comprising movement detector circuit means for detecting displacement of the variation of the picture per frame from the output of said memory circuit means and the output of said first circuit means, and movement compensator circuit means coupled between said memory circuit means and said first circuit means and controlled by an output of said movement detector circuit means for generating and providing to the first circuit means a past picture signal which corresponds to the same area as the input picture signal.

2. A noise reducing system according to claim 1, wherein said movement compensator circuit means comprises delay means for obtaining from the output of said memory circuit means a plurality of past picture signals each delayed a fixed short time with respect to each other, and switching circuit means which is changed-over by the output of said movement detector circuit means to select one of said plurality of past picture signals and to apply it to said first circuit means.

3. A noise reducing system according to claim 2, wherein said fixed short time is equal to a scanning time of one picture element of the picture.

4. A noise reducing system according to claim 2, wherein said movement detector circuit means comprises correlator means including a plurality of correlators for detecting correlations between the respective past picture signals and the input of said memory circuit, and selector means for detecting the correlator providing a maximum correlative output among said plurality of correlators and for driving said switching circuit means corresponding to the detected correlator.

5. A noise reducing system according to claim 1, wherein said movement compensator circuit means comprises an address counter which generates a first address signal for storing the mixed picture signal into a predetermined location of said memory circuit means, read means for generating a second address signal for reading out said picture signal stored in said memory circuit means, error detector circuit means for detecting the movement compensation error from the signal read out from said memory circuit means and said mixed picture signal, register means for storing a signal representing the movement in a frame period corrected with an output of said error detector circuit, and an adder which adds an output of said register means and the output of said read means and which provides the addition output as said second address signal.

* * * * *